(12) United States Patent
Smith

(10) Patent No.: US 12,415,482 B1
(45) Date of Patent: Sep. 16, 2025

(54) POWERED TRAILER LANDING GEAR SYSTEM

(71) Applicant: Thomas Smith, Suffolk, VA (US)

(72) Inventor: Thomas Smith, Suffolk, VA (US)

( * ) Notice: Subject to any disclaimer, the term of this patent is extended or adjusted under 35 U.S.C. 154(b) by 387 days.

(21) Appl. No.: 18/088,850

(22) Filed: Dec. 27, 2022

(51) Int. Cl.
  *B60S 9/04* (2006.01)
  *B60D 1/62* (2006.01)

(52) U.S. Cl.
  CPC .  *B60S 9/04* (2013.01); *B60D 1/62* (2013.01)

(58) Field of Classification Search
  CPC ................................. B60S 9/04; B60D 1/62
  See application file for complete search history.

(56) References Cited

U.S. PATENT DOCUMENTS

| | | | | |
|---|---|---|---|---|
| 4,097,840 A * | 6/1978 | Chappelle | ................. | B60S 9/04 280/766.1 |
| 4,345,779 A * | 8/1982 | Busby | ..................... | B60D 1/66 280/766.1 |
| 4,466,637 A * | 8/1984 | Nelson | ..................... | B60S 9/04 254/419 |
| 5,865,499 A * | 2/1999 | Keyser | ..................... | B60P 3/34 296/156 |
| 5,911,437 A * | 6/1999 | Lawrence | ................. | B60S 9/04 254/419 |
| 6,260,882 B1 * | 7/2001 | Kingsbury | ................ | B60S 9/08 254/219 |
| 6,598,886 B2 * | 7/2003 | Baird | ....................... | B60S 9/08 254/419 |
| 7,163,207 B2 * | 1/2007 | Baird | ....................... | B60P 3/34 254/419 |
| 7,328,884 B2 * | 2/2008 | Garceau | .................... | B66F 3/44 254/126 |
| D636,297 S | 4/2011 | Wu | | |
| 8,590,417 B1 * | 11/2013 | Bono | ....................... | B60S 9/08 254/419 |
| 8,827,309 B1 | 9/2014 | Ouellet | | |
| 9,242,622 B1 * | 1/2016 | Sanders | .................... | B60S 9/08 |
| 9,630,597 B1 * | 4/2017 | Magyar | .................... | B60S 9/08 |
| 10,343,654 B2 * | 7/2019 | Evans | ....................... | B66F 3/44 |
| 10,414,384 B2 * | 9/2019 | Smith, Sr. | ................. | B66F 3/44 |
| 10,464,193 B2 * | 11/2019 | Chen | .................... | B25B 23/0078 |
| 10,556,572 B2 * | 2/2020 | Sun | .......................... | B60S 9/12 |
| 10,661,763 B2 * | 5/2020 | Hart | ......................... | B60S 9/08 |
| 10,807,571 B1 * | 10/2020 | Myrex | ...................... | B60S 9/22 |
| 11,059,461 B2 | 7/2021 | Laarman | | |
| 11,148,645 B2 * | 10/2021 | Hicks | ...................... | F16H 37/04 |
| 11,787,372 B2 * | 10/2023 | Hicks | ...................... | F16H 1/222 254/419 |
| 11,912,249 B2 * | 2/2024 | Bedel | ....................... | B60S 9/08 |

(Continued)

*Primary Examiner* — Jacob B Meyer
(74) *Attorney, Agent, or Firm* — Kyle A. Fletcher, Esq.

(57) ABSTRACT

The powered trailer landing gear system is an aftermarket structure. The powered trailer landing gear system comprises a trailer clamp structure, a jib structure, an electric motor, and a trailer. The jib structure attaches the electric motor to the trailer clamp structure. The trailer clamp structure removably attaches the jib structure to the trailer. The trailer further comprises a trailer landing gear. The trailer landing gear further comprises a landing gear crank mount and pig tail. The electric motor draws electric energy from the pig tail. The electric motor provides the motive forces that deploy and retract the trailer landing gear.

12 Claims, 5 Drawing Sheets

(56) References Cited

U.S. PATENT DOCUMENTS

| | | | |
|---|---|---|---|
| 2004/0080125 A1* | 4/2004 | Bird | B60S 9/08 |
| | | | 280/6.153 |
| 2007/0257243 A1* | 11/2007 | Cofer | G05G 1/085 |
| | | | 254/419 |
| 2014/0077140 A1* | 3/2014 | Baird | B60S 9/08 |
| | | | 254/419 |
| 2017/0001603 A1* | 1/2017 | Chen | B25B 23/0078 |
| 2018/0141524 A1* | 5/2018 | Laarman | B60S 9/08 |
| 2019/0031159 A1* | 1/2019 | Sun | B60S 9/04 |
| 2019/0315264 A1 | 10/2019 | Swab | |
| 2021/0094517 A1 | 4/2021 | Belk | |

\* cited by examiner

POWERED TRAILER LANDING GEAR SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of ground-engaging vehicle fittings for supporting, lifting, or maneuvering a vehicle. (B60S9/04)

SUMMARY OF INVENTION

The powered trailer landing gear system is an aftermarket structure. The powered trailer landing gear system comprises a trailer clamp structure, a jib structure, an electric motor, and a trailer. The jib structure attaches the electric motor to the trailer clamp structure. The trailer clamp structure removably attaches the jib structure to the trailer. The trailer further comprises a trailer landing gear. The trailer landing gear further comprises a landing gear crank mount and pig tail. The electric motor draws electric energy from the pig tail. The electric motor provides the motive forces that deploy and retract the trailer landing gear.

These together with additional objects, features and advantages of the powered trailer landing gear system will be readily apparent to those of ordinary skill in the art upon reading the following detailed description of the presently preferred, but nonetheless illustrative, embodiments when taken in conjunction with the accompanying drawings.

In this respect, before explaining the current embodiments of the powered trailer landing gear system in detail, it is to be understood that the powered trailer landing gear system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the powered trailer landing gear system.

It is therefore important that the claims be regarded as including such equivalent construction insofar as they do not depart from the spirit and scope of the powered trailer landing gear system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
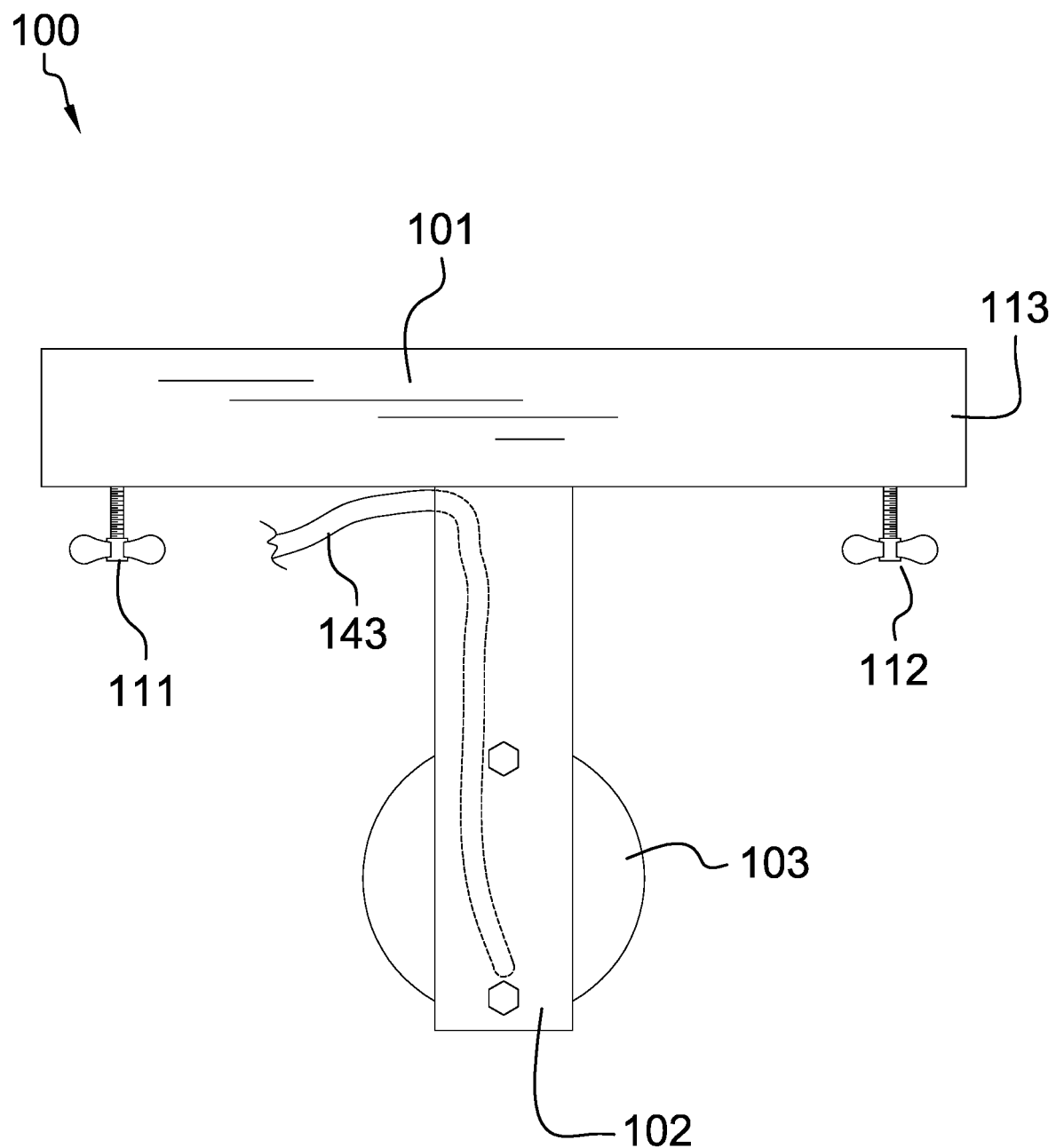
FIG. 1 is a front view of an embodiment of the disclosure.
Figure 2:
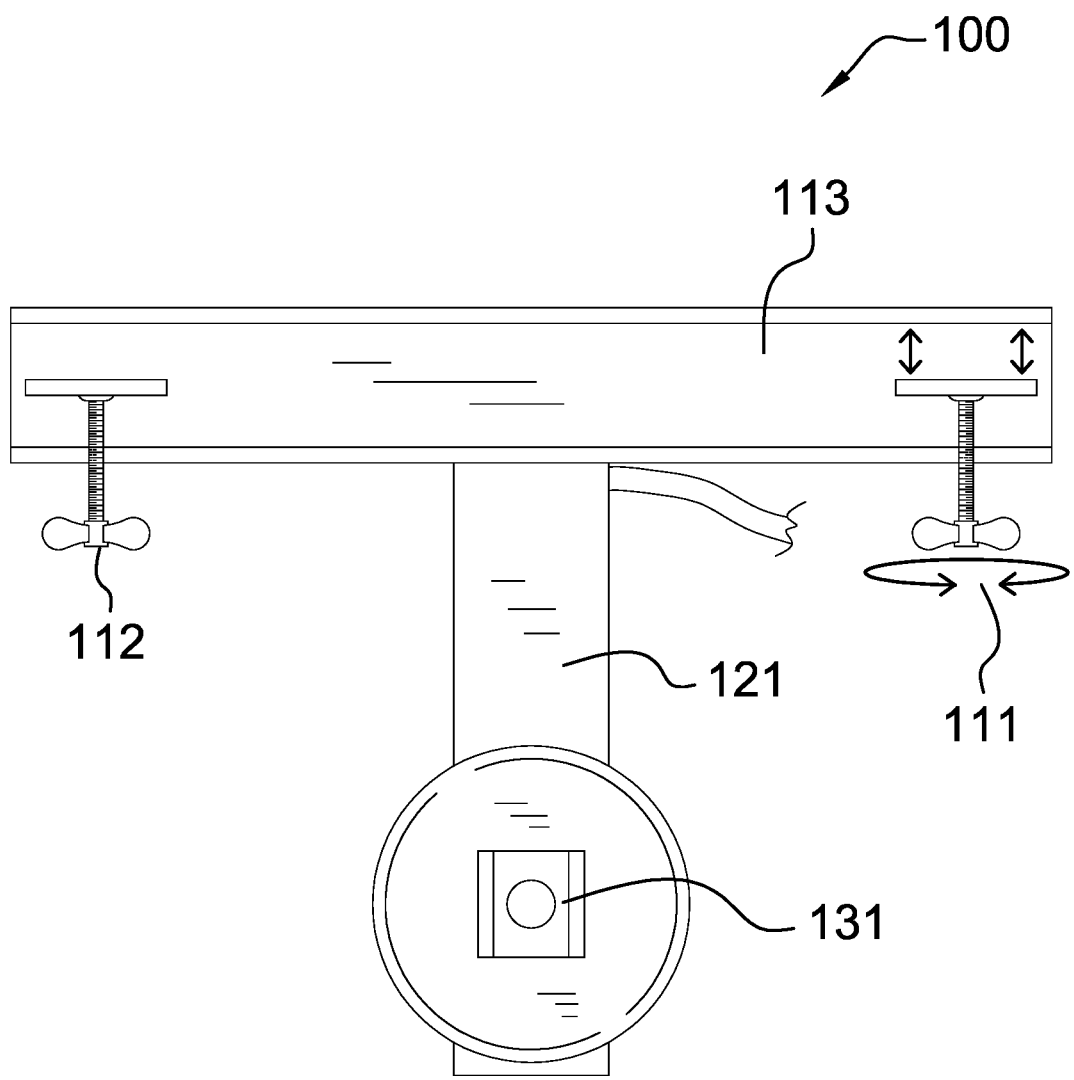
FIG. 2 is a rear view of an embodiment of the disclosure.
Figure 3:
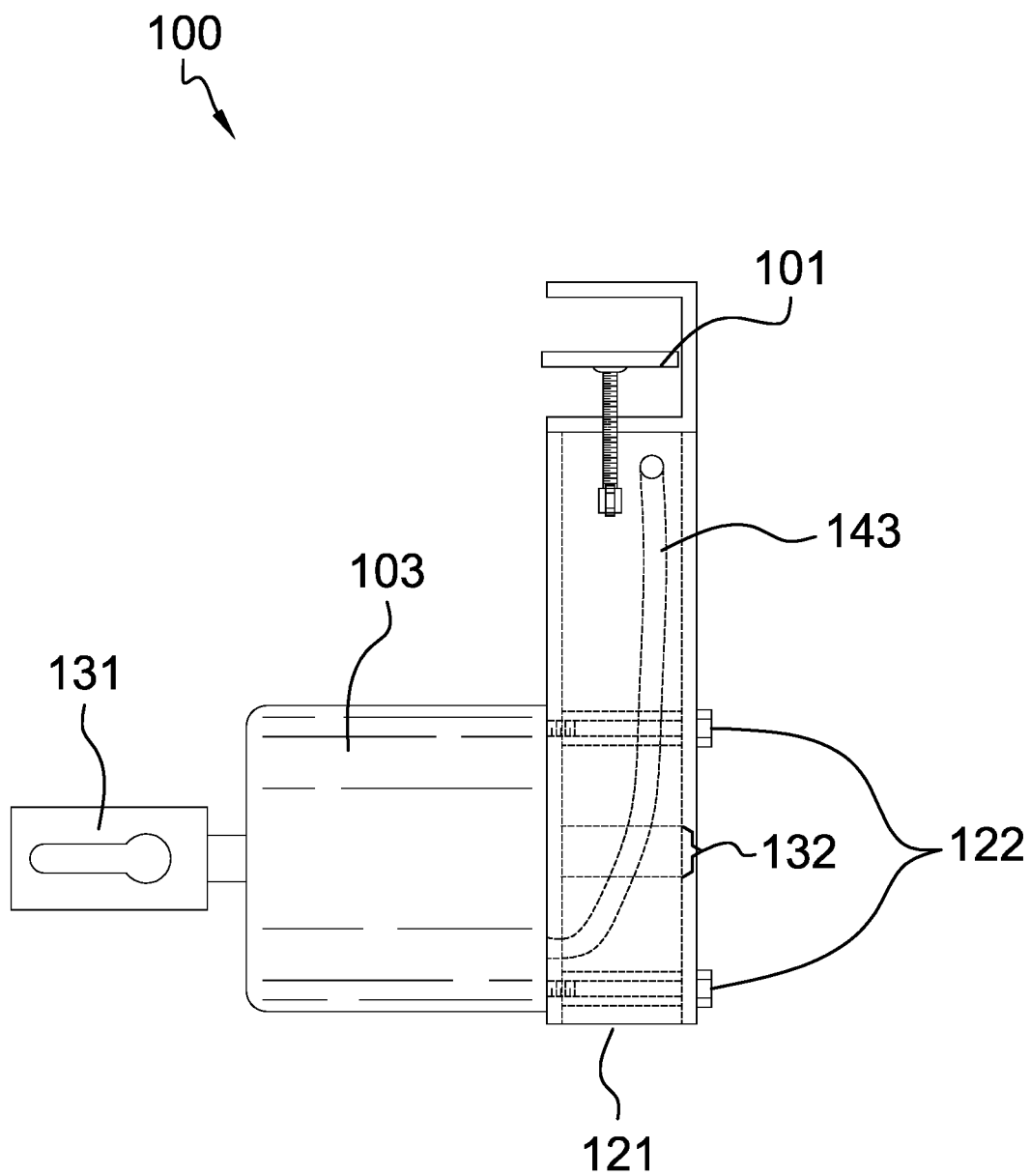
FIG. 3 is a side view of an embodiment of the disclosure.
Figure 4:
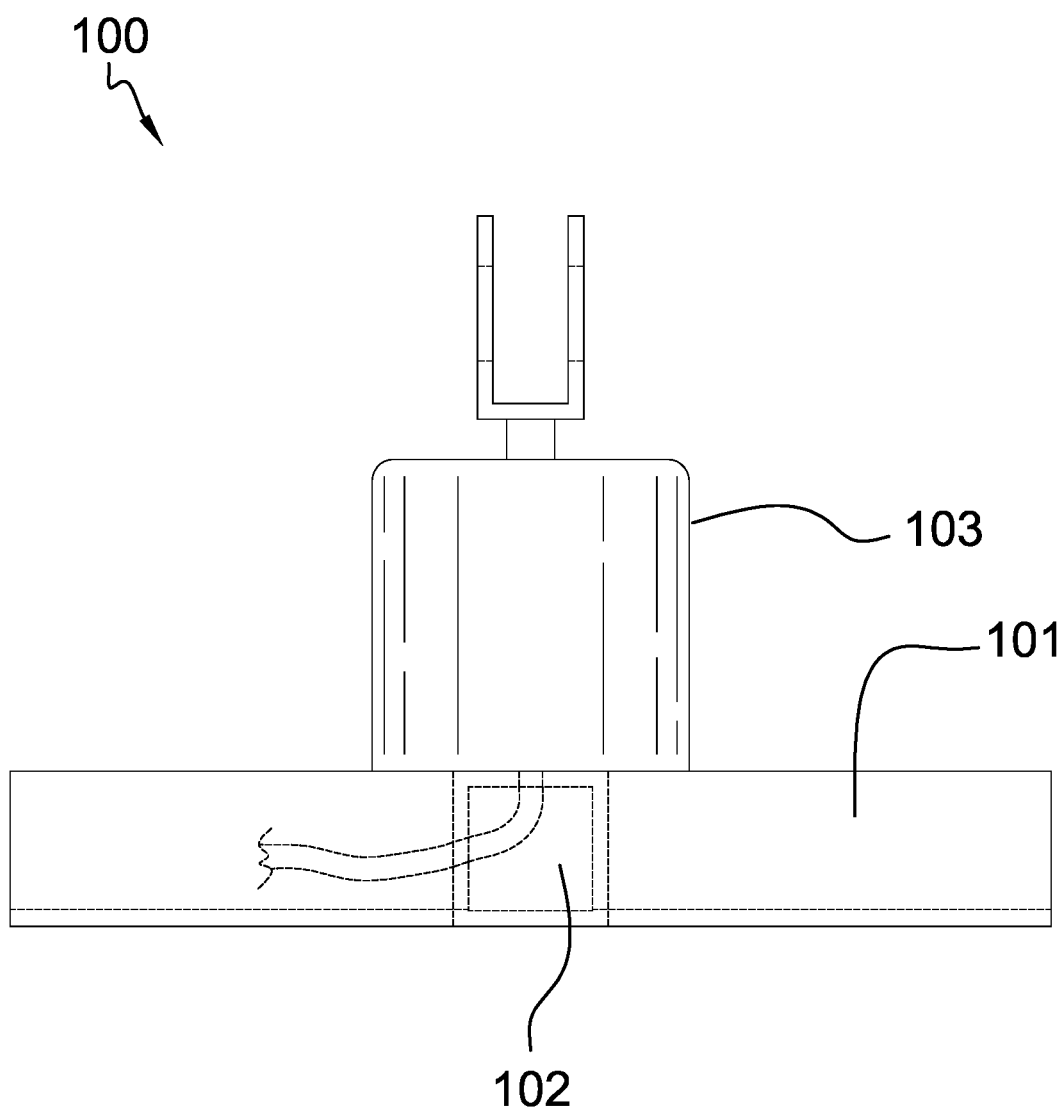
FIG. 4 is a top view of an embodiment of the disclosure.
Figure 5:
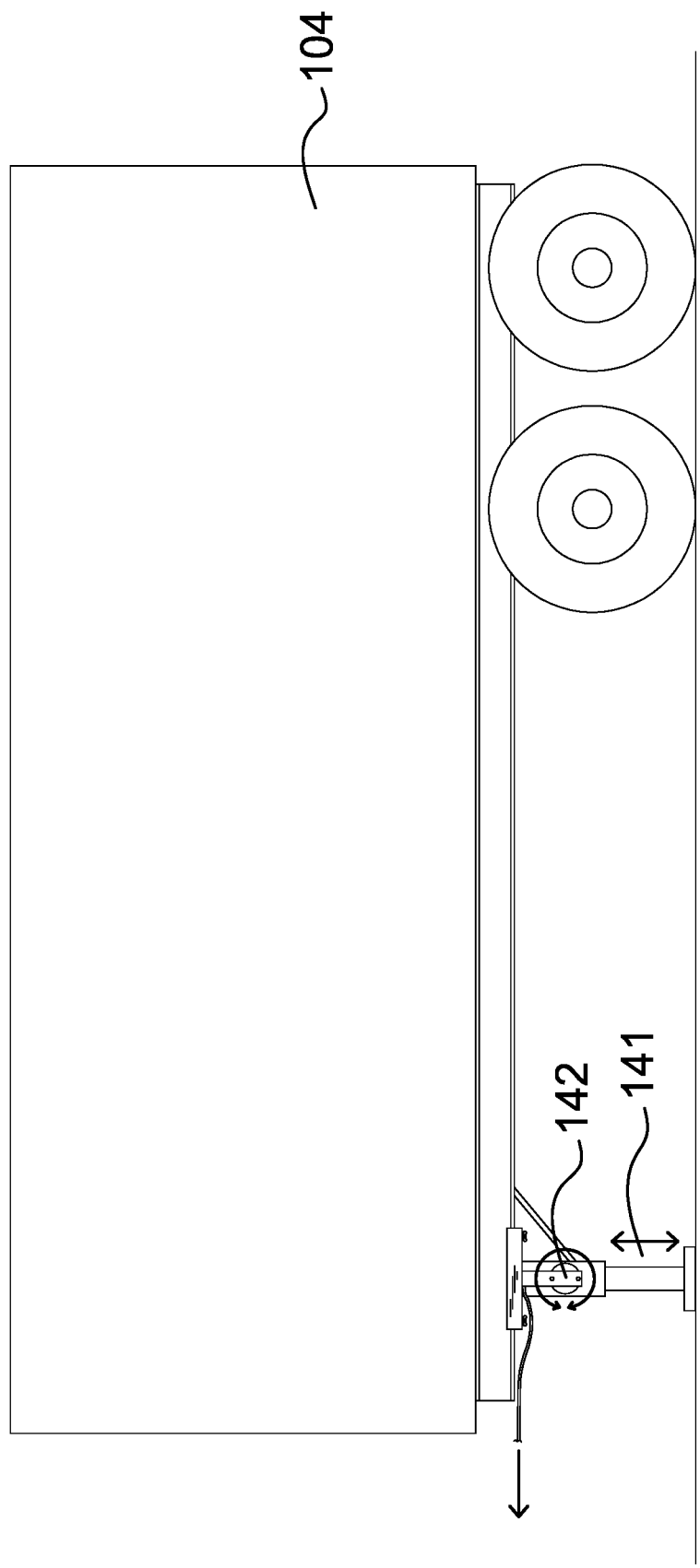
FIG. 5 is an in-use view of an embodiment of the disclosure.

Detailed reference will now be made to one or more potential embodiments of the disclosure, which are illustrated in FIGS. 1 through 5.

The powered trailer landing gear system 100 (hereinafter invention) is an aftermarket structure. The invention 100 comprises a trailer 104 clamp structure 101, a jib structure 102, an electric motor 103, and a trailer 104. The jib structure 102 attaches the electric motor 103 to the trailer 104 clamp structure 101. The trailer 104 clamp structure 101 removably attaches the jib structure 102 to the trailer 104. The trailer 104 further comprises a trailer 104 landing gear 141. The trailer 104 landing gear 141 further comprises a landing gear 141 crank mount 142 and pig tail 143. The electric motor 103 draws electric energy from the pig tail 143. The electric motor 103 provides the motive forces that deploy and retract the trailer 104 landing gear 141.

The trailer 104 is defined elsewhere in this disclosure. The trailer 104 landing gear 141 is defined elsewhere in this disclosure. The pig tail 143 is defined elsewhere in this disclosure.

The landing gear 141 crank mount 142 is a mount that is presented to the electric motor 103 by the trailer 104 landing gear 141. The electric motor 103 removably attaches to the landing gear 141 crank mount 142. The removal of the electric motor 103 allows the landing gear 141 crank mount 142 to be manually operated.

The trailer 104 clamp structure 101 is a fastening device. The trailer 104 clamp structure 101 removably attaches the trailer 104 clamp structure 101, the jib structure 102, and the electric motor 103 to the trailer 104. The trailer 104 clamp structure 101 permanently attaches to the jib structure 102. The trailer 104 clamp structure 101 comprises a first clamp structure 111, a second clamp structure 112, and a c-channel structure 113.

The c-channel structure 113 is a rigid structure. The c-channel structure 113 is formed as a c-channel. The span of the length between the first arm and the second arm of the u-shaped structure of the c-channel structure 113 is sized such that the horizontally oriented anchor plate of the trailer 104 landing gear 141 inserts into the interarm space of the c-channel structure 113. The first clamp structure 111 secures the c-channel structure 113 to the horizontally oriented anchor plate of the trailer 104 landing gear 141. The second clamp structure 112 secures the c-channel structure 113 to the horizontally oriented anchor plate of the trailer 104 landing gear 141. The c-channel structure 113 is the structure of the trailer 104 clamp structure 101 that permanently attaches to the jib structure 102.

The first clamp structure 111 is a fastening device. The clamp is defined elsewhere in this disclosure. The first clamp structure 111 removably attaches the c-channel structure 113 to the trailer 104 landing gear 141. The first clamp structure 111 secures the c-channel structure 113 to an anchor point that is formed as a horizontally oriented plate structure.

The second clamp structure 112 is a fastening device. The clamp is defined elsewhere in this disclosure. The second clamp structure 112 removably attaches the c-channel structure 113 to the trailer 104 landing gear 141. The second clamp structure 112 secures the c-channel structure 113 to an anchor point that is formed as a horizontally oriented plate structure. The second clamp structure 112 is identical to the first clamp structure 111.

The jib structure 102 is a jib. The jib structure 102 attaches to the electric motor 103. The jib structure 102 suspends the electric motor 103 from the trailer 104 clamp structure 101. The jib structure 102 forms the reach between the trailer 104 clamp structure 101 and the electric motor 103. The jib structure 102 suspends the electric motor 103 into a position proximal to the electric motor 103. By proximal position is meant that the electric motor 103 is located such that a detachable mechanical linkage can be formed between the electric motor 103 and the landing gear 141 crank mount 142 of the trailer 104 landing gear 141 of the trailer 104. The jib structure 102 comprises a square tubing 121 and a motor mount 122.

The square tubing 121 is a rigid structure. The square tubing 121 is a prism shaped structure. The square tubing 121 is a load bearing structure. A fixed congruent end of the prism structure of the square tubing 121 permanently attaches to an arm of the c-channel structure 113 of the trailer 104 clamp structure 101 selected from the group consisting of the first arm of the u-shaped structure of the c-channel structure 113 and the second arm of the u-shaped structure of the second clamp structure 112. The fixed congruent end of the square tubing 121 attaches to the face of the selected arm with the greatest surface area. The fixed congruent end of the square tubing 121 attaches to the face of the selected arm such that the center axis of the prism structure of the square tubing 121 projects perpendicularly away from the selected arm.

The motor mount 122 is a mechanical apparatus. The motor mount 122 is formed in the lateral face of the prism structure of the square tubing 121. The motor mount 122 attaches the electric motor 103 to the lateral face of the square tubing 121. The motor mount 122 suspends the electric motor 103 from the square tubing 121. The electric motor 103 attaches to the lateral face of the prism structure of the square tubing 121. The span of the length of the square tubing 121 is selected such that the electric motor 103 is positioned to allow the electric motor 103 to form a mechanical linkage with the trailer 104 landing gear 141.

The electric motor 103 is an electromechanical device. The electric motor 103 converts electric energy into rotational energy. The electric motor 103 attaches to the motor mount 122 of the jib structure 102. The jib structure 102 suspends the electric motor 103 from the trailer 104 clamp structure 101. The electric motor 103 forms a detachable mechanical linkage with the landing gear 141 crank mount 142. The rotational energy of the electric motor 103 transfers to the landing gear 141 crank mount 142. The rotation of the landing gear 141 crank mount 142 causes the load path formed by the trailer 104 landing gear 141 to deploy and retract the load path.

The electric motor 103 comprises a drive fitting 131 and a landing gear 141 crank fitting 132. The drive fitting 131 is a mechanical apparatus. The drive fitting 131 attaches to the rotor of the electric motor 103 such that the rotation of the rotor will rotate the landing gear 141 crank mount 142. The drive fitting 131 transfers the rotational energy generated by the electric motor 103 into the trailer 104 landing gear 141. The landing gear 141 crank fitting 132 is a mechanical apparatus. The drive fitting 131 attaches to the rotor of the electric motor 103 at the end of the rotor that is distal from the drive fitting 131.

The following definitions were used in this disclosure:

Aftermarket Structure: As used in this disclosure, an aftermarket structure refers to a structure that modifies an object after the object has been procured and put into use. The aftermarket structure has a purpose selected from the group consisting of: a) replacing a component or structure of the object for maintenance purposes; and, b) enhancing the function of the object beyond what was provided by the object's original state. The term aftermarket part is a synonym for aftermarket structure.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

C-Channel: As used in this disclosure, the C-channel is a load bearing structure, such as a beam, that is formed in a U-shape. The C-channel forms a prism shape with a hollow interior and an open face that forms a shape characteristic of the letter C. The open space of the C-channel is often used as a track. A C-channel is a U-shaped structure.

Cant: As used in this disclosure, a cant is an angular deviation from one or more reference lines (or planes) such as a vertical line (or plane) or a horizontal line (or plane).

Cargo: As used in this disclosure, cargo refers to one or more objects that are intended to be transported using a vehicle. The term freight is a synonym for cargo.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned.

When the center axes of two cylinder, prism or pyramidal structures do not share the same line they are said to be offset.

Clamp: As used in this disclosure, a clamp refers to a structure that temporarily fastens to the one or more faces of one or more prism structures. The clamp is used: a) to attach an externally provisioned object to the lateral face of a prism structure; or, b) to press a first face of a first prism to a second face of a second prism.

Collapsible: As used in this disclosure, the terms collapsible refers to an object that is configured such that the volume of the object is adjustable. By volume is meant the volume of the perimetrical boundary that contains the object. The verbs collapse and retract mean that the volume of the perimetrical boundary of the object changes from a larger volume to a smaller volume. The verbs expand and deploy mean that the volume of the perimetrical boundary of the object changes from a smaller volume to a larger volume.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Container: As used in this disclosure, a container is a structure that forms a protected space (or protection space) used to store and transport an object. The term containment structure is a synonym for container. Use protected space or protection space.

Correspond: As used in this disclosure, the term correspond is used as a comparison between two or more objects wherein one or more properties shared by the two or more objects match, agree, or align within acceptable manufacturing tolerances.

Diameter: As used in this disclosure, a diameter of an object is a straight line segment (or a radial line) that passes through the center (or center axis) of an object. The line segment of the diameter is terminated at the perimeter or boundary of the object through which the line segment of the diameter runs. A radius refers to the line segment that overlays a diameter with one termination at the center of the object. A span of a radius is always one half the span of the diameter.

Diametrically Opposed: As used in this disclosure, diametrically opposed is a term that describes the locations of a first object and a second object located at opposite ends of a diameter drawn through a third object. The term diametric opposition can also be used to describe this relationship.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term roughly geometrically similar is meant that the primary shapes of two objects are geometrically similar except that there are functional items (such as fastening devices) associated with the primary shape may not maintain the ratio for geometric similarity.

Ground: As used in this disclosure, the ground is a solid supporting surface formed by the Earth. The term level ground means that the supporting surface formed by the ground is roughly perpendicular to the force of gravity. The term underground refers to an object being underneath the superior surface of the ground.

Handle: As used in this disclosure, a handle is an object by which a tool, object, or door is held or manipulated with the hand.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Jib: As used in this disclosure, a jib is a beam structure that is used to suspend a load.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Perimetrical Boundary: As used in this disclosure, a perimetrical boundary is a hypothetical rectangular block that contains an object. Specifically, the rectangular block selected to be the perimetrical boundary is the rectangular block with the minimum volume that fully contains the object. In a two-dimensional structure, the perimetrical boundary is the rectangle with the minimum surface area.

Pigtail: As used in this disclosure, a pigtail refers to an electrical wiring apparatus that attaches the electrical system of a trailer to the electrical system of a tractor.

Primary Shape: As used in this disclosure, the primary shape refers to a description of the rough overall geometric shape of an object that is assembled from multiple components or surfaces. Use Roughly Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Radial: As used in this disclosure, the term radial refers to a direction that: 1) is perpendicular to an identified central axis; or, 2) projects away from a center point.

Rigid Structure: As used in this disclosure, a rigid structure is a solid structure formed from an inelastic material that resists changes in shape. A rigid structure will permanently deform as it fails under a force. See bimodal flexible structure.

Square Tubing: As used in this disclosure, square tubing is a square prism-shaped structure. The square tubing forms a hollow tubular structure. The square tubing is a metal structure that is commonly used for structural purposes. The term punched square tubing refers to a square tubing with a plurality of diametrically opposed aperture pairs formed through the lateral faces of the prism structure of the square tubing. The punched square tubing is often referred to as a perforated square tubing.

Stanchion: As used in this disclosure, a stanchion refers to a vertically oriented prism-shaped pole, post, or support.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Tongue: As used in this disclosure, a tongue is a shaft structure that attaches to a trailer such that the shaft structure: projects away from the trailer in a direction parallel to the primary sense of direction of the trailer. The apparatus required to hitch the trailer to a tractor mounts on the tongue.

Tractor: As used in this disclosure, a tractor is a vehicle having a powerful diesel or gasoline powered engine that is used to tow one or more trailers.

Trailer: As used in this disclosure, a trailer is an unpowered wheeled vehicle that is towed by a powered vehicle such as a tractor.

Trailer Landing Gear: As used in this disclosure, a trailer landing gear is an adjustable pedestal structure. The trailer landing gear is configured for use with a trailer. The trailer landing gear mounts on the trailer. The trailer landing gear forms a load path the transfers the load of the trailer to a supporting surface. The trailer landing gear is the structure that replaces the load path formed by a tractor such that the tractor can be disconnected from the trailer. The trailer landing gear is an adjustable structure. By adjustable is meant that the elevation of the trailer landing gear is adjustable such that the cargo contained in the trailer will be held on a horizontally oriented platform.

Tube: As used in this disclosure, the term tube is used to describe a hollow prism-shaped device with two congruent open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

U-Shaped Structure: As used in this disclosure, a U-shaped structure is a type of offset composite prism structure. The U-shaped structure is a three sided structure comprising a crossbeam, a first arm, and a second arm. In a U-shaped structure, the first arm and the second arm project away from the crossbeam: 1) in the same direction; 2) at a roughly perpendicular angle to the crossbeam, and, 3) the span of length of the first arm roughly equals the span of length of the second arm. An illiterate U-shaped structure refers to a U-shaped structure wherein the span of the length of the first arm differs from the span of the length of the second arm by more than 10 percent. A guided U-shaped structure refers to a U-shaped structure that has: a) the first arc formed by the interior cant formed between the first arm and the crossbeam is greater than or equal to 100 degrees; b) a second arc formed by the interior cant formed between the second arm and the crossbeam is greater than or equal to 100 degrees; and, c) the first arc and the second arc are roughly equal.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A powered trailer landing gear system comprising
a trailer clamp structure, a jib structure, an electric motor, and a trailer;
wherein the jib structure attaches the electric motor to the trailer clamp structure;
wherein the trailer clamp structure removably attaches the jib structure to the trailer;
wherein the trailer further comprises a trailer landing gear;
wherein the trailer landing gear further comprises a landing gear crank mount and pig tail;
wherein the jib structure suspends the electric motor from the trailer clamp structure;
wherein the jib structure forms the reach between the trailer clamp structure and the electric motor;
wherein the jib structure suspends the electric motor into a position proximal to the landing gear crank mount;
wherein the trailer clamp structure comprises a first clamp structure, a second clamp structure, and a c-channel structure;
wherein the first clamp structure removably attaches the c-channel structure to the trailer landing gear;
wherein the second clamp structure removably attaches the c-channel structure to the trailer landing gear.

2. The powered trailer landing gear system according to claim 1 wherein the powered trailer landing gear system is an aftermarket structure.

3. The powered trailer landing gear system according to claim 2
wherein the electric motor draws electric energy from the pig tail;
wherein the electric motor provides the motive forces that deploy and retract the trailer landing gear;
wherein the electric motor removably attaches to the landing gear crank mount.

4. The powered trailer landing gear system according to claim 3
wherein the trailer clamp structure is a fastening device;
wherein the trailer clamp structure removably attaches the trailer clamp structure, the jib structure, and the electric motor to the trailer;
wherein the trailer clamp structure attaches to the jib structure.

5. The powered trailer landing gear system according to claim 4
wherein the jib structure is a jib;
wherein the jib structure attaches to the electric motor;
wherein by proximal position is meant that the electric motor is located such that a detachable mechanical linkage can be formed between the electric motor and the landing gear crank mount of the trailer landing gear of the trailer.

6. The powered trailer landing gear system according to claim 5
wherein the electric motor is an electromechanical device;
wherein the electric motor converts electric energy into rotational energy;
wherein the electric motor attaches to the motor mount of the jib structure;
wherein the jib structure suspends the electric motor from the trailer clamp structure;
wherein the electric motor forms a detachable mechanical linkage with the landing gear crank mount.

7. The powered trailer landing gear system according to claim 6
wherein the jib structure comprises a square tubing and a motor mount;
wherein the motor mount is formed in the lateral face of the square tubing.

8. The powered trailer landing gear system according to claim 7
wherein the electric motor further comprises a drive fitting;
wherein the drive fitting is a mechanical apparatus;
wherein the drive fitting attaches to the rotor of the electric motor such that the rotation of the rotor will rotate the landing gear crank mount.

9. The powered trailer landing gear system according to claim 8
wherein the c-channel structure is a rigid structure;
wherein the c-channel structure is formed as a c-channel;
wherein the span of the length between the first arm and the second arm of the u-shaped structure of the c-channel structure is sized such that the horizontally oriented anchor plate of the trailer landing gear inserts into the interarm space of the c-channel structure;
wherein the first clamp structure secures the c-channel structure to the horizontally oriented anchor plate of the trailer landing gear;

wherein the second clamp structure secures the c-channel structure to the horizontally oriented anchor plate of the trailer landing gear;

wherein the c-channel structure is the structure of the trailer clamp structure that permanently attaches to the jib structure.

10. The powered trailer landing gear system according to claim 9 wherein the first clamp structure is a fastening device;

wherein the first clamp structure secures the c-channel structure to an anchor point that is formed as a horizontally oriented plate structure;

wherein the second clamp structure is a fastening device;

wherein the second clamp structure removably attaches the c-channel structure to the trailer landing gear;

wherein the second clamp structure secures the c-channel structure to an anchor point that is formed as a horizontally oriented plate structure;

wherein the second clamp structure is identical to the first clamp structure.

11. The powered trailer landing gear system according to claim 10 wherein the square tubing is a rigid structure;

wherein the square tubing is a load bearing structure;

wherein a fixed congruent end of the square tubing permanently attaches to an arm of the c-channel structure of the trailer clamp structure selected from the group consisting of the first arm of the u-shaped structure of the c-channel structure and the second arm of the u-shaped structure of the second clamp structure;

wherein the fixed congruent end of the square tubing attaches to the face of the selected arm with the greatest surface area;

wherein the fixed congruent end of the square tubing attaches to the face of the selected arm such that the center axis of the square tubing projects perpendicularly away from the selected arm.

12. The powered trailer landing gear system according to claim 11 wherein the motor mount is a mechanical apparatus;

wherein the motor mount attaches the electric motor to the lateral face of the square tubing;

wherein the motor mount suspends the electric motor from the square tubing;

wherein the electric motor attaches to the lateral face of the square tubing;

wherein the span of the length of the square tubing is selected such that the electric motor is positioned to allow the electric motor to form a mechanical linkage with the trailer landing gear.

* * * * *